Figure 1:
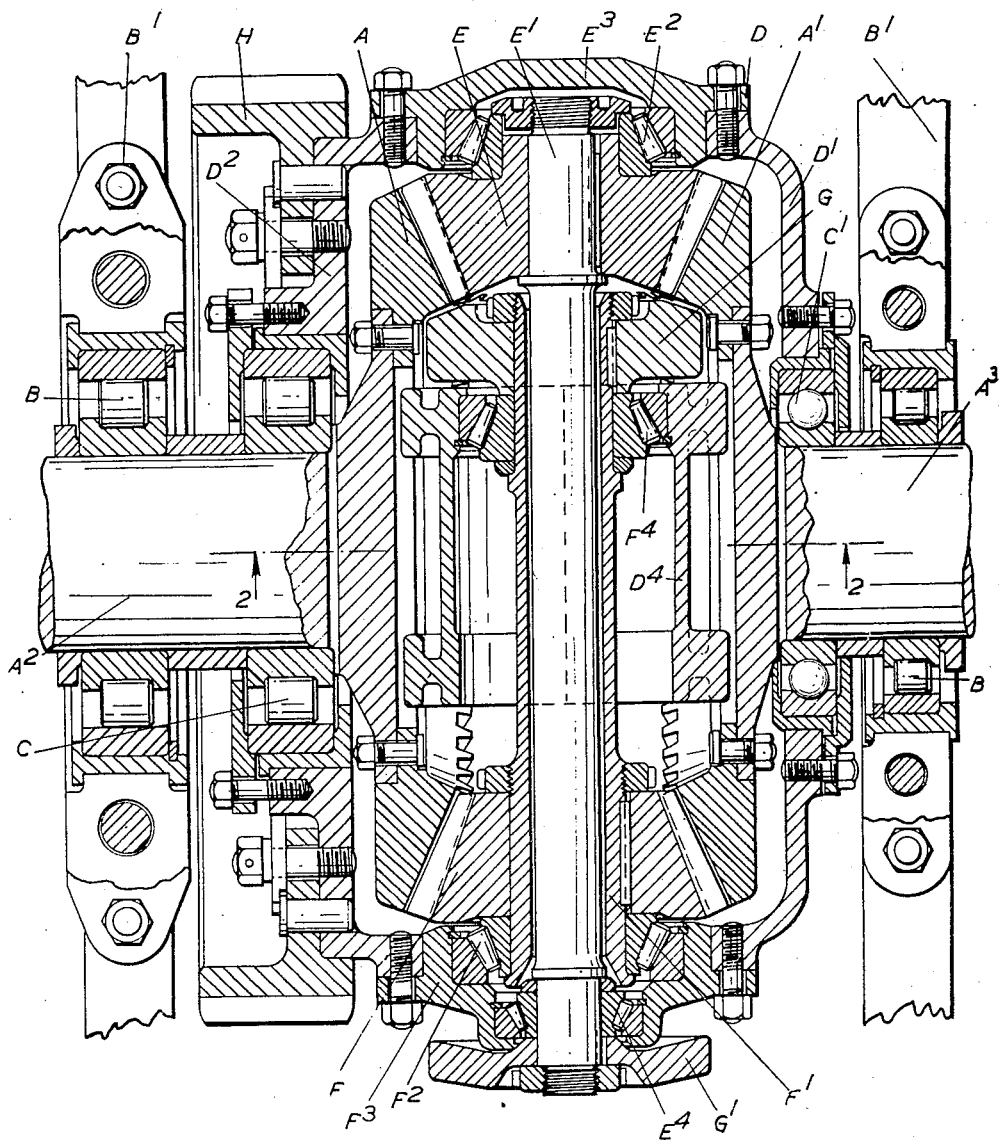
Figure 1:

Sept. 4, 1951  R. J. W. COUSINS  2,566,601

DIFFERENTIAL TRANSMISSION GEARING

Filed Dec. 11, 1950  2 Sheets-Sheet 1

Inventor
Richard J. W. Cousins
By

Attorney

UNITED STATES PATENT OFFICE 2,566,601

DIFFERENTIAL TRANSMISSION GEARING

Richard Joseph Walsh Cousins, Shoreham-by-Sea, England, assignor to Fell Developments Limited, London, England, a British company Application December 11, 1950, Serial No. 200,198
In Great Britain December 22, 1949

5 Claims. (Cl. 74—713)

This invention relates to differential transmission gearing of the bevel wheel type, that is to say of the kind in which the sun and planet wheels are bevel wheels so that the axes of rotation of the planet wheels are radial and in which each planet wheel meshes with two coaxial sun wheels, and is concerned with differential transmission gears of this kind in which during operation the planet wheel carrier (hereinafter for brevity called the planet carrier) rotates.

The invention is particularly but not exclusively applicable to differential transmission gearing of the kind referred to in which the planet carrier may rotate at a comparatively high speed and may have special application to one or more of the differential gear mechanisms used in power plants of the kind forming the subject of British Patent No. 598,042 or of British Patent No. 628,448.

The object of the invention is to provide an improved arrangement of differential gearing of the kind referred to in which the unbalanced loads on certain parts will be eliminated or substantially reduced.

In differential transmission gearing of the kind referred to according to the present invention each planet wheel is connected to a weight lying on the side of the axis of rotation of the planet carrier remote from the planet wheel and thus serving to counter-balance partially or wholly the centrifugal forces acting on the planet wheel due to the rotation of the planet carrier.

In a convenient arrangement according to the invention the planet carrier carries two coaxial planet wheels arranged on opposite sides of the axis of rotation of the planet carrier one of the planet wheels having formed on or rigidly connected to it a tubular sleeve which extends across the axis of rotation of the planet carrier and is provided at its end remote from the planet wheel with a counter-balancing weight conveniently of annular form, while the other planet wheel is rigid with a shaft which passes through the tubular sleeve and through the first planet wheel and is provided at its end with the appropriate counter-balancing weight, also preferably of annular form. In such an arrangement the planet carrier conveniently includes a bridge piece extending across it in a general direction at right angles to the common axis of the planet wheels and at right angles to the sun wheel axis and carrying at its centre a bearing in which the end portion of the sleeve remote from its planet wheel is supported, each planet wheel being supported adjacent to its outer face by a bearing carried by the planet carrier, while the end of the shaft which extends through the tubular sleeve is also supported in the carrier at a point between the weight carried by it and the adjacent bearing for the adjacent planet wheel.

Figure 2:
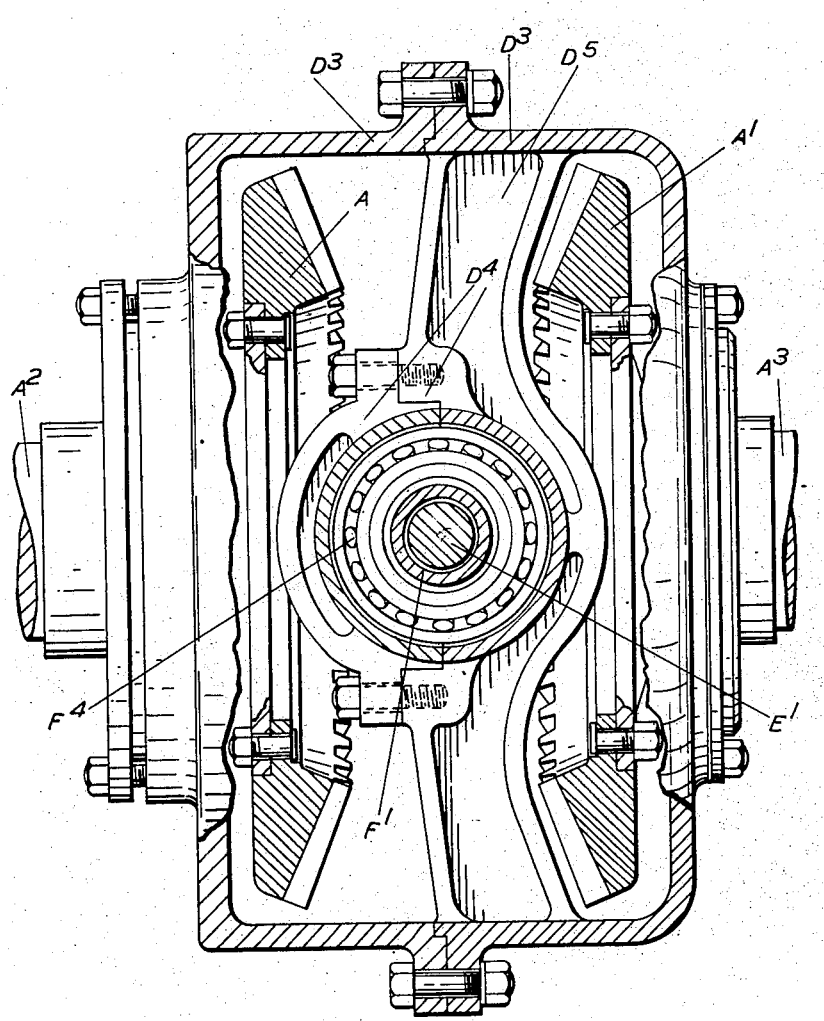

The invention may be carried into practice in various ways but one construction of differential transmission gearing according to the invention is illustrated by way of example in the accompanying drawings, in which Figure 1 is a cross-sectional view in a plane containing the common axis of two coaxial bevel type sunwheels mounted on driving shafts and the common axis of two bevel type planet wheels, and Figure 2 is a side elevation of the arrangement shown in Figure 1 with certain parts shown in cross-section in the plane 2—2 normal to the common axis of the planet wheels and certain parts omitted for simplicity.

In the construction illustrated the differential transmission gearing comprises two similar coaxial planet type sun wheels A, A¹ rigidly mounted n the adjacent ends of driving shafts A², A³ supported in bearings B in a suitable supporting structure indicated generally at B¹ in Figure 1 but omitted for simplicity in Figure 2. Rotatably mounted upon the two shafts A², A³ by means of a roller bearing C and a ball bearing C¹ and substantially enclosing the sun wheels A, A¹ is a two part annular casing D constituting the planet wheel carrier of the transmission gear and including end walls D¹, D² and a circumferential wall D³ extending between the circumferential edges of the two end walls D¹, D².

Supported on a common radial axis within the planet carrier D are two planet wheels E, F each of which meshes with the two sun wheels A, A¹ as shown. The planet wheel F is rigidly mounted upon a tubular sleeve F¹ which is supported at one end by thrust type roller bearings F² carried in a bearing housing F³ mounted in the circumferential wall D³ of the planet carrier and is supported adjacent to its other end in thrust type roller bearings F⁴ supported in a bearing housing D⁴ carried by a bridge piece D⁵ which extends across the interior of the planet carrier, as shown most clearly in Figure 2, and is formed integral at its ends with the circumferential wall D³ of that carrier.

The other planet wheel, E, is rigidly carried upon a shaft E¹ coaxial with the sleeve F¹ and extending through it as shown, the planet wheel E and its shaft E¹ being supported at one end in a thrust type roller bearing E² mounted in a bearing housing E³ secured to the circumferential wall D³ of the planet carrier while it is supported at its other end in a thrust type roller bearing E⁴ carried by the bearing housing F³.

Rigidly mounted upon the end of the tubular sleeve F¹ at a point on the side of the bearing F⁴ remote from the planet wheel F is an annular weight G of such mass in relation to its radial distance from the common axis of the shafts A² and A³ as to bring the centre of gravity of the complete assembly comprising the planet wheel F, the tubular sleeve F¹ and the weight G to a point adjacent to or approximately coincident with the axis of the shafts A², A³.

Rigidly mounted upon the end of the shaft E¹ remote from the planet wheel E is a further annular weight G¹ which has such mass in relation to its distance from the common axis of the shafts A², A³ that the assembly comprising the planet wheel E, the shaft E¹ and the weight G¹ has a centre of gravity which lies adjacent to or coincident with the common axis of the shafts A², A³.

Secured to the end wall D² of the planet carrier D is a gear wheel H (shown in Figure 1 but omitted from Figure 2 for simplicity) by which power can be transmitted to driven mechanism.

The differential transmission gearing as described with reference to the drawings may be used in the transmission mechanism of a power plant of the kind forming the subject of British Patent No. 598,042 or of British Patent No. 628,448, the two shafts A², A³ being then arranged to receive torque from two internal combustion engines through hydraulic transmission devices or from the driven members of other differential gears the driving members of which are arranged to receive power respectively from internal combustion engines, while the planet carrier D constitutes the driven member of the differential transmission gearing from which power is transmitted by the gear wheel H.

It will be seen that during rotation of the planet carrier D centrifugal forces applied to the planet wheels E and F are counterbalanced wholly or partly by the annular weights G and G¹ connected to them respectively through the tubular sleeve F¹ and the shaft E¹, thus relieving the bearings E³ and F², which have to take outward thrust of the planet wheels, from the heavy loads to which they would otherwise be subjected due to centrifugal forces.

It will be understood that, although in the arrangement described the counterbalancing weights G and G¹ are arranged so as to bring the centres of gravity of their associated assemblies to points substantially coincident with the axis of rotation of the planet carrier D, the arrangement may be such that these weights only partially counterbalance the end thrust applied to their associated planet wheels due to centrifugal force or such that they somewhat more than counterbalance such centrifugal forces and thus, under conditions of load, tend to relieve the principal thrust bearings associated with the planet gears from the full axial thrust resulting from transmission loads.

The embodiments of the invention in which an exclusive property or privilege is claimed are defined as follows:

1. Differential gearing comprising two coaxial bevel sun wheels, a planet wheel carrier mounted for rotation about the common axis of the sun wheels and independently thereof, first and second coaxial bevel planet wheels mounted for rotation in the planet wheel carrier and each meshing with both the sun wheels, a first weight situated on the side of said common axis remote from said first planet wheel, first rigid connecting means for connecting said first weight to said first planet wheel, a second weight situated on the side of the said common axis remote from said second planet wheel, and second rigid connecting means for connecting said second weight to said second planet wheel.

2. Differential gearing according to claim 1, wherein said first connecting means comprises a shaft fixed to said first planet wheel and extending radially to said common axis, through said second planet wheel, and said second connecting means comprises a tubular sleeve fixed to said second planet wheel and rotatably mounted on said shaft, the said weights having the form of annular members carried respectively by said shaft and tubular sleeve.

3. In combination with the differential gearing according to claim 2, a bridge piece fixed in the planet wheel carrier and extending in a direction generally perpendicular to the common axis of the planet wheels, a bearing carried by said bridge piece for supporting said tubular sleeve at the end thereof remote from said second planet wheel, a bearing in said planet wheel carrier for supporting said second planet wheel, a bearing in said planet wheel carrier for supporting said first planet wheel, and a bearing in said planet wheel carrier for supporting the end of said shaft remote from said first planet wheel, said first weight being located on the side of the last-named bearing remote from said first planet wheel.

4. Differential gearing according to claim 1, wherein each said planet wheel with its associated weight and connecting means constitutes an assembly the centre of gravity of which is adjacent to or coincident with the said common axis of the sun wheels.

5. Differential gearing according to claim 1, wherein each said planet wheel with its associated weight and connecting means constitutes an assembly the centre of gravity of which is on the side of the common axis of the sun wheels remote from said planet wheel.

RICHARD JOSEPH WALSH COUSINS.

No references cited.